Figure 1:
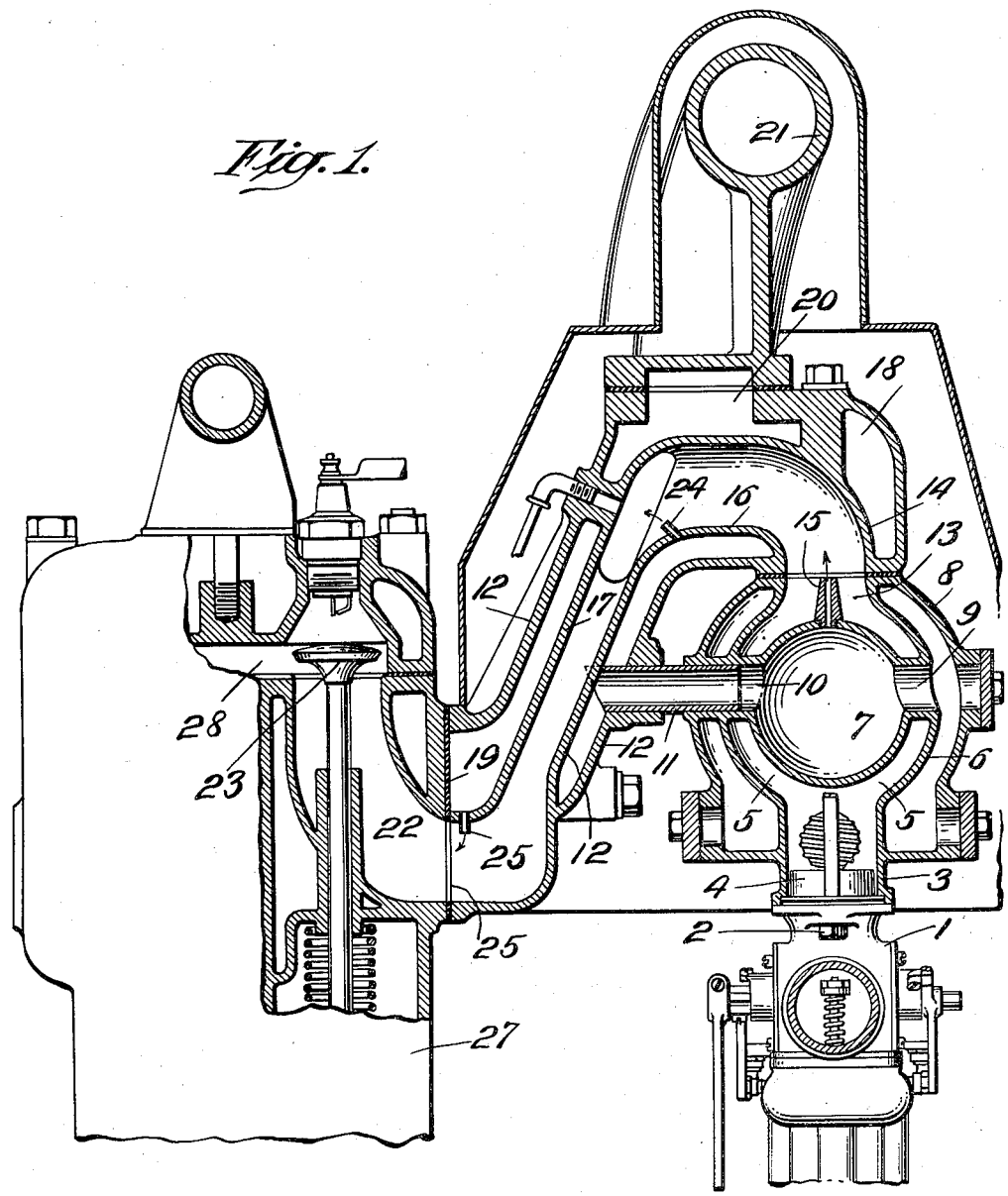

Jan. 1, 1929.

W. P. DEPPE 1,697,385

INTERNAL COMBUSTION ENGINE

Filed May 7, 1921

3 Sheets-Sheet 1

Inventor
Wm. P. Deppe
By his Attorney
M. H. Lockwood

Jan. 1, 1929. 1,697,385
W. P. DEPPÉ
INTERNAL COMBUSTION ENGINE
Filed May 7, 1921    3 Sheets-Sheet 2
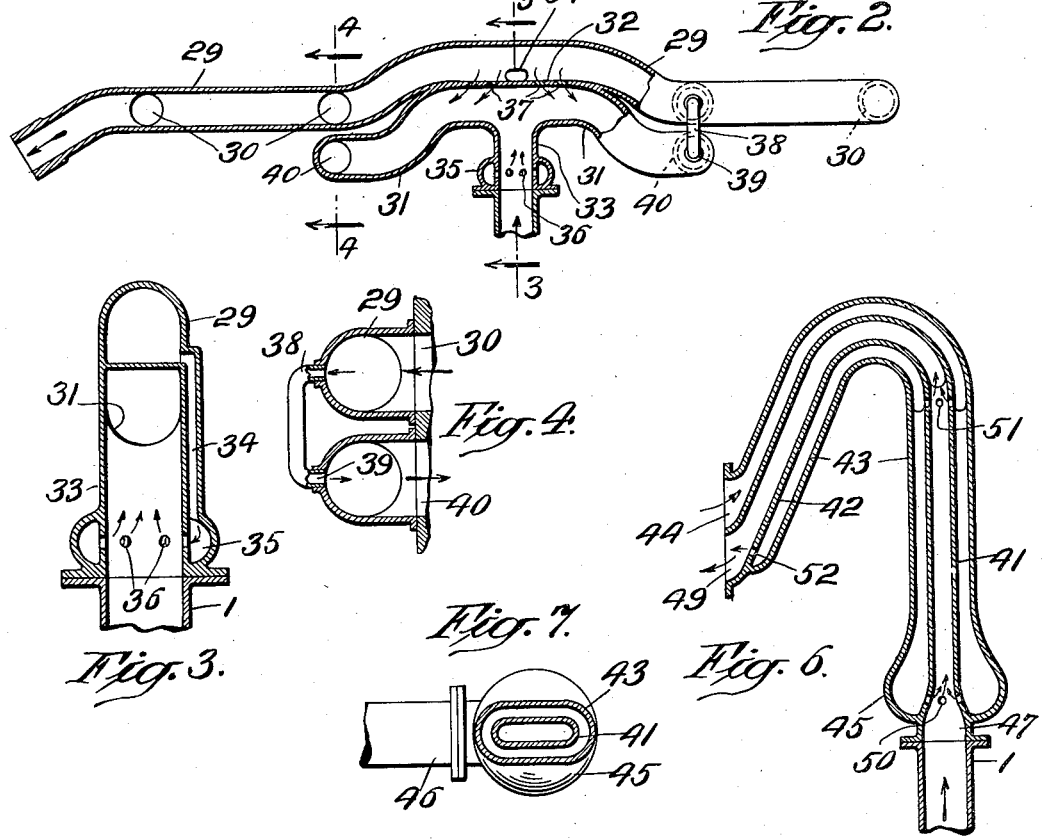
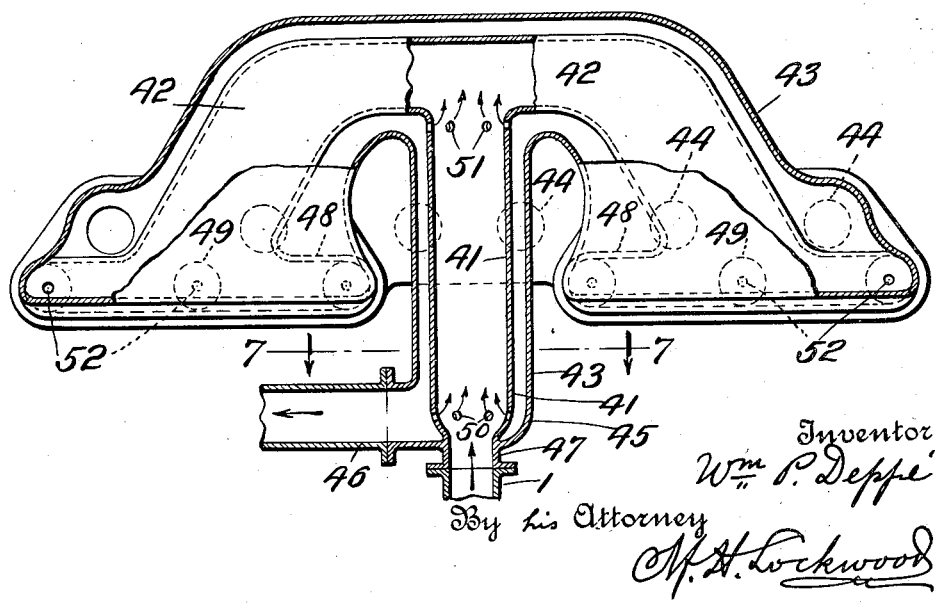

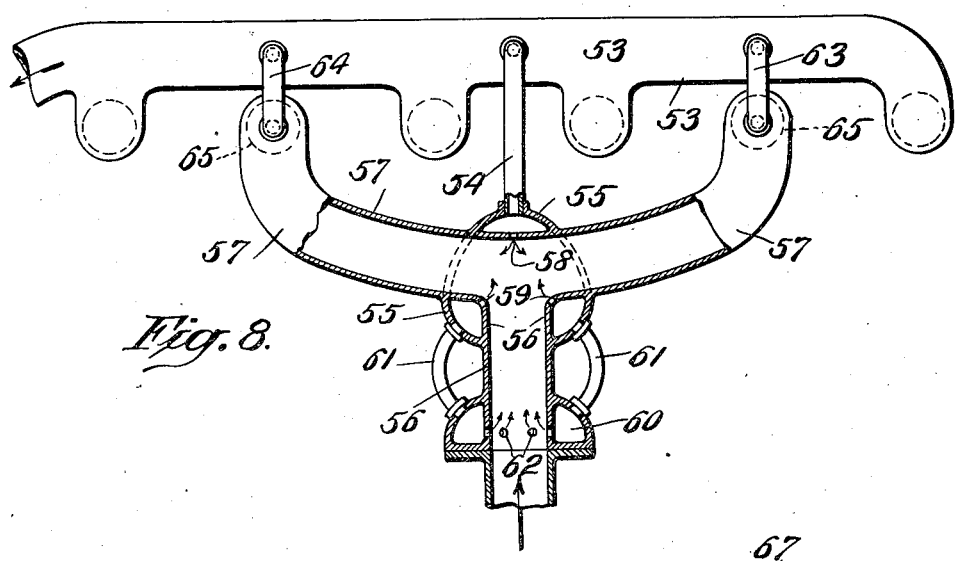
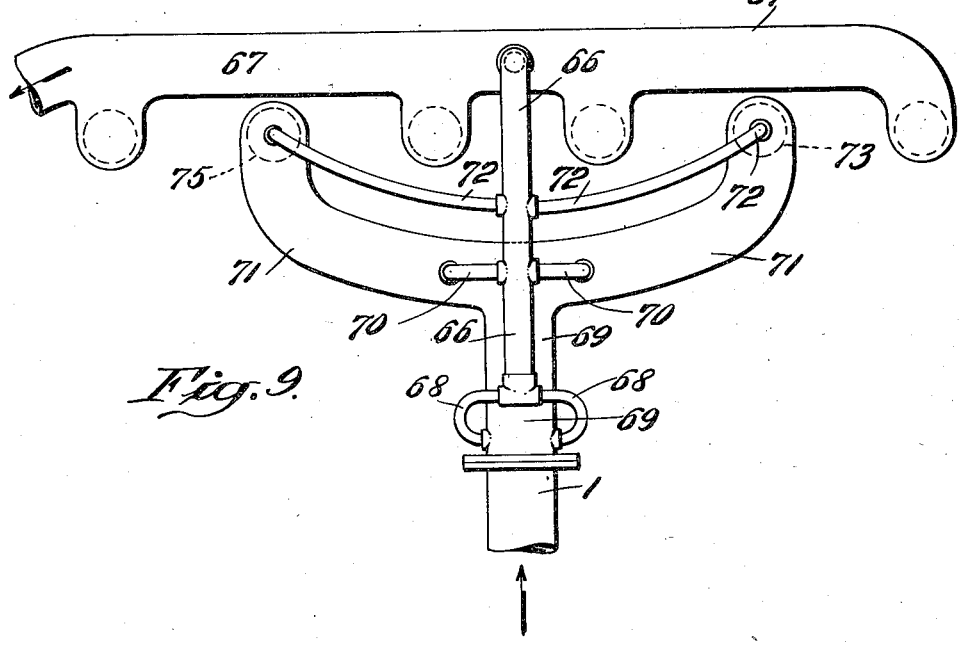

Patented Jan. 1, 1929.

1,697,385

UNITED STATES PATENT OFFICE.

WILLIAM P. DEPPÉ, OF BRIGHTWATERS, NEW YORK.

INTERNAL-COMBUSTION ENGINE.

Application filed May 7, 1921. Serial No. 467,532.

My improvement relates more particularly to the injection of hot exhaust gases from the engine, directly into the intake manifold to serve as a diluent, for the mixture, and for creating turbulance therein on its way to the engine. Furthermore, the injection of hot exhaust gases into the mixture, while creating turbulence at the point of injection, may be utilized for raising the temperature of the mixture, the turbulence assisting in diffusing the heat and rendering the mixture homogeneous.

My present improvement also contemplates the injection of hot exhaust gases into the intake manifold at successive points along the manifold, so that the hot exhaust gases may thereby be utilized for progressively raising the temperature of the mixture on its way to the engine.

In carrying out my improvement, the engine is operated on a homogeneous superheated dry gaseous mixture, which is preferably prepared by applying heat to the mixture progressively or at successive stages, the liquid fuel particles being completely vaporized and thereafter the mixture is superheated. This method is now well known in the art, and is in use on several well known makes of cars. It is also well known scientifically, that the vapor in a mixture cannot be superheated until the liquid is completely vaporized, and the point of complete vaporization or the boiling point varies according to the conditions. For instance, in mixtures of air and liquid fuels, the partial pressure boiling point of the liquid fuel is the controlling factor and determines the temperature of operation.

It will be further understood that the temperature of the intake conduits touching the fuel and air mixtures, or the exhaust gas injections into the fuel charges must not be allowed to exceed the spheroidal point or the cracking points of the fuels used, otherwise it is impossible to produce and maintain a homogeneous dry gaseous mixture.

The principal object of my improvement is to utilize the hot exhaust gases, as a diluent for the mixture for controlling combustion in the engine cylinders, so that greater efficiency may be obtained by utilizing higher compression pressures than have heretofore been possible under wet mixture practice, without the disastrous effects of preignition, autoignition or socalled detonations and knocks, which interfere with the smooth and efficient operation of automobile motors, and limit the range of refined oils suitable for motor fuels.

A further object of my present improvement is to utilize the heat of the products of combustion in the manifold proper, for raising the temperature of the mixture at different points, and particularly, at the intake ports where the temperature is likely to drop slightly during the passage of the mixture into the cylinders of the engine. The injection of hot exhaust gases into the intake ports and valve chambers, not only creates turbulence in the valve chambers for thoroughly diffusing the mixture and equalizing the heat throughout the mass at the time the mixture is being drawn into the cylinder, but the injection of hot exhaust gases into the mixture as it enters the combustion chambers has the effect of supercharging the cylinders.

I have also found that there may be, under certain conditions a considerable drop of temperature in the mixture after it passes the throttle and as it enters the lower end of the intake manifold trunk, and, therefore, a further object of my improvement is to provide for the injection of diluent hot exhaust gases into the mixture at this point, where the added heat may be utilized for raising the temperature of the mixture, and the turbulence set up by the injection of the exhaust gases will assist in thoroughly diffusing the heat through the mixture column.

I have also found that there may be a slight variation in temperature at the junction between the intake manifold trunk and the spreader arms, or branches leading to the intake ports, particularly in multi-cylinder engines of large size and, therefore, a further object of my improvement is to provide for the injection of hot exhaust gases into the intake manifold at the junction between the riser and spreader arms. It will be understood that at this point, the stream of mixture in the intake manifold is divided and, in engines having six or more cylinders, it is likely that at least two cylinders may be taking mixture at the same time. Therefore, by injecting hot exhaust gases into the mixture at the junction between the riser and spreader arms, the temperature of the mixture may be controlled and the mere act of injecting the exhaust gases may be utilized to assist in properly and uniformly charging the various cylinders of the engine. It will be understood that the exhaust gases in the exhaust manifold are slightly above atmospheric pressure, and, therefore, are injected under a pressure, which may be at times, considerable above the pressure in the intake manifold, where the vacuum pressure may range from a fraction of an inch to twenty inches, according to the speed and throttle openings.

The total amount of exhaust gases, which may be injected or introduced into the mixture in the intake manifold before it reaches the cylinders of the engine, must be carefully regulated to provide the necessary amount of diluent required for any particular size and type of engine, and, therefore, the amount injected at different points should be carefully proportioned or limited by the size and number of inlet holes or injection nozzles. However, as previously stated, it is desirable to inject the exhaust gases at different successive points along the intake manifold, in order that the temperature of the mixture may be progressively raised toward the engine and the mixture maintained at a proper temperature, during its introduction into the engine cylinders.

With the introduction of hot exhaust gases into the mixture at different points along the intake manifold and the proper determination of the size of the injection nozzles or holes, it will be understood that the relative amount of exhaust gases thus introduced will be automatically controlled and regulated according to the speed of the engine and the vacuum pressure in the intake manifold. In this manner I have found that the temperature of the mixture, at the time it is introduced into the engine may be maintained practically uniform, for all speeds and the mixture supplied with the required amount of diluent gases. This is an important feature of my improvement for it automatically takes care of the temperature, as well as controlling the mixture, so as to completely eliminate the necessity for any adjustments being made by the user; all such adjustments being made at the factory and fixed for each particular motor or car.

The engine, therefore, according to my method, may be operated with greater thermal efficiency, and the diluent hot exhaust gases may be utilized not only to assist in raising the temperature of the mixture, progressively, when properly introduced along the intake of the engine, but the turbulence created by the injection assists in diffusing the heat and rendering the mixture homogeneous. Such injections may be particularly desirable in the valve chambers, so as to maintain the superheat temperature of the mixture and assist in its introduction into the combustion chambers.

It should be understood also, that there is a wide difference in putting hot exhaust gases into thoroughly vaporized highly heated fuel charges as compared with putting hot exhaust gases in cold wet mixtures, for here one has to reckon with the solubility of the exhaust gases and light vapors in the fuel constituents carried along as fine liquid particles or as heavy mist or vapor.

Heat cannot be satisfactorily transferred quickly to a wet mixture, and with secondary condensations, when using fuels of the present heterogeneous character, the troubles are aggravated by the incessant throttle variations in motor cars under operating conditions in the hands of the public and even in stationary engines with widely shifting loads. Therefore, the advance made by my method, utilizing my superheated mixtures with diluent exhaust gases, can readily be appreciated.

To serve as a diluent and to assist in homogenizing the mixture and raising the temperature, however, the exhaust gases may be introduced into various types of the ordinary manifold with which various makes of internal combustion engines may be equipped. Therefore, in the accompanying drawings, I have shown various forms of apparatus for carrying out my improvement in connection with internal combustion engines, which may be equipped with intake and exhaust manifolds.

In the accompanying drawings, Fig. 1 represents a vertical section of my improved heater and mixer and manifold construction, in which the intake manifold is enclosed within the exhaust manifold; Fig. 2 shows how exhaust gases may be injected into a hot-spot type of manifold; Fig. 3 is a transverse section of the manifold of Fig. 2 on the line 3—3; Fig. 4 is a transverse section on the line 4—4 of Fig. 2; Fig. 5 represents another type of intake manifold, which is flattened throughout its length and enclosed within the exhaust manifold; Fig. 6 represents a vertical section, through the manifolds of Fig. 5; Fig. 7 is a transverse section of the riser portion of the manifold of Fig. 5 on the line 7—7; Fig. 8 represents another arrangement of the exhaust and intake manifolds, showing how the exhaust gases may be utilized for injection into the intake manifold and for heating portions thereof and Fig. 9 represents a common type of exhaust and intake manifold arrangement, in which exhaust gases may be introduced into the intake manifold at various points.

Referring to the drawings, and particularly to Fig. 1 thereof, the carburetor or metering device 1 may be of the usual or any preferred form, such as shown in my Patent No. 1,163,223, of December 7, 1915, and may be secured to the lower end of the intake manifold or mixture conduit in the usual manner, as by bolts 2, through the upper flange of the carburetor. In the form shown in Fig. 1, the carburetor is attached to the lower end 3 of my heater and mixer, which is more particularly described in my Patent No. 1,189,797 of July 4, 1916. The lower end 3 of the heater and mixer is shown as provided within the conduit with a rotary mixer 4, and the conduit 5, is annular in cross-section, being formed between the conduit wall 6 and a spherical bulb 7, within and spaced from the wall 6, as indicated in Fig. 1 of the drawings. The conduit wall 6 is surrounded by a jacket 8 through which exhaust gases are adapted to pass for heating the conduit 5 on the outside and for heating the mixing chamber 3, in which the rotary mixer 4 is located. The spherical bulb 7 is supported in position by tubular connections 9 and 10, the latter of which is connected by the pipe 11, with the exhaust chamber 12, the arrangement being such that the exhaust gases are passed through the pipe 11, into the bulb 7 and from the latter into the jacket 8 and from thence to the atmosphere through a suitable outlet (not shown). The upper end of the annular conduit 5 is restored to cylindrical form at 13 and the heater and mixer is connected with the trunk or riser section 14 of the intake manifold, so that the mixture passes directly thereinto from the heater and mixer.

As shown and described in my application, Ser. No. 433,179, hereinbefore referred to, the upper portion of the bulb 7 may be provided with a nozzle 15 for the injection of hot exhaust gases into the mixture as it leaves the heater and mixer and enters the lower end of the trunk section 14 of the intake manifold.

In the form shown in Fig. 1 of the drawings, the trunk section 14 of the intake manifold curves over horizontally at 16 and divides into the spreader arms 17, which are thinly flattened, as indicated in the drawings, and more particularly shown in my application, above referred to.

The exhaust manifold 12 is preferably in the form of a flattened chamber, surrounding and enclosing the branches or spreader arms 17 of the intake manifold, the upper end 18 of the exhaust manifold being extended in the form of a jacket enclosing the trunk section 14—16 of the intake manifold, so as to heat the entire intake manifold. It will be seen that the exhaust will enter from the engine ports at 19 and pass upward along and around the intake manifold, the flow being in the opposite direction from the flow of the mixture toward the engine, so that the temperature of the mixture may be raised progressively by the transfer of heat from the exhaust gases. The exhaust gases are taken off, in this form of construction through the opening 20, above the trunk of the intake manifold and passes out through the exhaust pipe 21.

The mixture is introduced into the cylinders or combustion chambers through the valve chambers 22, in which the usual valves 23 are located. In carrying on my present improvement, I preferably provide holes or nozzles 24 at the junction between the trunk 16 and spreader arms 17, for the injection of hot exhaust gases into the mixture at this point of the intake manifold, the exhaust gases being drawn directly from the surrounding exhaust manifold or chamber 12, as indicated in Fig. 1 of the drawings. It is desirable to introduce a predetermined amount of the required diluent exhaust gases at this point, for creating turbulence and heating the mixture, for here the mixture divides into the two branches or spreader arms and it frequently occurs that the fluid will be required to flow in both branches or spreader arms at the same time and the hot exhaust gases are found to assist materially in making the flow to the respective cylinders of the engine more uniform.

I have also found it desirable to inject hot exhaust gases, which ultimately form a part of the diluent in the combustion chambers, into the mixture as it enters or passes through the valve chamber 22 and for this purpose suitable holes or nozzles 25 may be provided at the intake ports 26 of the engine, thereby creating turbulence in the valve chambers and providing for additional heat in the mixture to compensate for any slight drop that might ordinarily occur, when the mixture passes through the valve chambers into the combustion chambers of the engine.

The engine is represented at 27, and it will be noted that the clearance at 28 may be reduced very considerably in engines operating according to my method, so as to provide compression pressures, which may range up to 100 pounds or more according to the size and requirements for various engines.

Under certain conditions and where found desirable my method of injecting hot exhaust gases into the mixture may be carried out in connection with manifold constructions after the manner of the so-called hot-spot, and such an arrangement I have shown in Figs. 2 to 4 of the drawings. In these views the exhaust manifold is represented at 29, and may receive exhaust gases from the engine through the ports indicated at 30. In this construction, the intake manifold 31 is integral at 32 with the lower side of the exhaust manifold, so as to leave a thin wall therebetween, which lies directly above the intake manifold trunk 33, so that the fuel charge rushing up through the trunk or riser 33, will carry the heavier particles of the combustibles against the highly heated hot-spot and the latter will assist in rapidly vaporizing the fuel and to that extent heat the mixture. The lower end of the riser 33 may be connected to the upper end 1 of the carburetor or metering device, which may be of any usual or any preferred form.

In adapting this form to utilize hot exhaust gases as a diluent and to assist in raising the temperature of the mixture, I preferably may cast the manifolds with a by-pass conduit 34 (see Fig. 3) leading from the exhaust manifold 29, down back of the intake manifold riser 33 to the lower end thereof, where it joins with an annular jacket or chamber 35, as indicated in Fig. 3 of the drawings. The wall of the riser 33, within the annular chamber 35, is preferably provided with a plurality of small holes at 36, through which exhaust gases from the chamber 35 may be injected into the incoming fuel mixture, at the lower end of the trunk 33 and immediately after the mixture leaves the carburetor. It will be understood that introducing the diluent gases at this point, has the effect of creating turbulence and the heat of the exhaust gases is thereby thoroughly diffused through the mixture and utilized in raising the temperature thereof. The quantity of hot exhaust gases to be introduced through the holes 36 may be regulated by the size and number of the holes.

It has previously been pointed out that there is always more or less disturbance of the flow of mixture at the dividing point thereof, that is, at the junction between the riser and spreader arms, and I preferably may inject a portion of the required diluent gases into the mixture through the holes at 37, at each side of the hot spot, as indicated in Fig. 2 of the drawings. Injecting the hot exhaust gases into the mixture at this point will further assist in creating turbulence and raising the temperature of the mixture and may also be utilized to assist in directing the flow of mixture toward the ports.

As hereinbefore stated, it is desirable to create turbulence in the mixture, as it enters the valve chambers and, therefore, in the form shown in Figs. 2 to 4, exhaust gases are injected into the intake manifold, directly back of the intake ports, the connections between the manifolds being made by pipes 38, as indicated in Figs. 2 and 4 of the drawings. By this arrangement, it will be seen that the exhaust gases from the exhaust manifold 29, are injected into the ends of the spreader arms at 39, practically opposite the inlet ports 40, thereby creating turbulence in the mixture and heating it at the time it enters the combustion chambers of the engine.

In Figs. 5 to 7, I have shown my improvement in connection with a different form of manifold in which the intake manifold is flattened for sheeting the mixture, both in the riser and spreader arms. The intake manifold comprising the riser 41 and spreader arms 42 is completely enclosed within the exhaust manifold 43, the latter being indicated as uniformly spaced from the flattened side walls of the intake manifold, as indicated more particularly in Fig. 6, which shows a section of the conduit through the riser and one of the spreader arms. The exhaust is admitted to the exhaust chamber through the openings 44, and it will be seen that the exhaust flows along the outside of the intake manifold in an opposite direction to the flow of mixture within the intake manifold, thereby providing for progressively heating the mixture by the transfer of heat from the hot exhaust gases to the incoming mixture. The exhaust chamber 43 continues downward around the riser 41 and swells out, at 45, where it is jointed to the exhaust pipe 46, as indicated in Fig. 5 of the drawings. The lower or open end 47 of the riser 41 of the intake manifold is connected to the upper end of the carburetor 1, which may be of the usual or any preferred form. The manifold branches or spreader arms 42, at the engine, are extended laterally, as indicated in dotted lines at 48, to cover the intake ports, indicated by dotted circles at 49, in Fig. 5 of the drawings. It will be understood that the flattened construction of the riser 41 and spreader arms 42, as indicated in Figs. 5 to 7 of the drawings, facilitates more rapid transfer of heat from the surrounding exhaust gases and the sheeted mixture is heated on both sides.

In this construction, (Figs. 5 to 7), I may preferably provide holes 50, near the lower end 47 of the riser and within the swelled portion 45 of the exhaust manifold, so that exhaust gases may be admitted at this point for creating turbulence and raising the temperature of the mixture. The amount of diluent exhaust gases admitted through the holes 50 may be regulated by the size and number of the holes according to requirements.

I preferably may also provide holes 51 at the junction between the riser and spreader arms, for the purpose of creating turbulence at this point and further raising the temperature of the mixture.

While the injection of exhaust gases at various points along the manifold may be utilized to asisst in rendering the mixture more homogeneous and for progressively raising the temperature of the mixture, as previously stated, the amount of such diluent gases required is limited for various engines and equipments and, therefore, the amount injected at different points along the intake manifold should be carefully regulated to meet these requirements. Therefore, in each case, the size and number of holes should be so selected as to properly proportion the diluent gases.

In the form indicated in Figs. 5 and 6 of the drawings, I preferably may place injection holes at 52 for injecting diluent hot exhaust gases into the mixture directly into the valve chambers, thereby creating turbulence at these points and compensating for any drop of temperature that might occur during the entrance of the mixture into the combustion chambers of the engine.

In Fig. 8 of the drawings, I have shown another form of manifold arrangement for injecting hot exhaust gases to serve as a diluent for the mixture and for utilizing the heat thereof to progressively raise the temperature of the mixture, as it passes through the intake manifold. In the form shown in Fig. 8, the exhaust manifold 53 is separate from the intake manifold, and, as indicated, the exhaust manifold is connected by a pipe 54 with a jacket 55 surrounding the junction between the riser 56 and the spreader arms 57 of the manifold, thereby providing for heating the mixture at the dividing point thereof. Within the jacket 55, I may preferably insert holes at 58 and 59 for admitting diluent exhaust gases to the intake manifold at the junction between the riser and spreader arms, for creating turbulence in the mixture and assisting in raising the temperature thereof.

In the form shown in Fig. 8, I have also shown the lower end of the riser 56 as surrounded by a jacket 60, which may be connected by pipes 61 with the jacket 55, so that exhaust gases from the latter may pass into the annular jacket 60 and there utilized for heating the lower end of the riser. In order to create turbulence in the mixture at this point and assist in raising the temperature thereof, I may provide holes 62 for injecting diluent hot exhaust gases from the jacket 60 into the mixture at the lower end of the riser, as indicated in Fig. 8 of the drawings.

In this form, (Fig. 8) I also indicate the injection of hot exhaust gases into the ends of the spreader arms 57 of the intake manifold, by means of pipes 63 and 64, which are adapted to conduct exhaust gases directly from the exhaust manifold 53 into the respective spreader arms opposite the intake ports, indicated by dotted circles 65. Therefore, in this form, the diluent exhaust gases are admitted at various points along the intake manifold, and utilized for progressively raising the temperature of the mixture.

In Fig. 9 of the drawings, I have shown a slightly different form of piping connections for utilizing hot exhaust gases as a diluent for the mixture and for injecting the same into the intake manifold at different points, along the riser and spreader arms. In Fig. 9, the pipe 66 leads from the exhaust manifold 67 downward, and the lower end thereof is provided with branch pipes 68 leading into the lower end of the riser 69, thereby providing for injecting hot exhaust gases into the mixture, after it leaves the carburetor 1, and enters the lower end of the manifold. Branch pipes 70 take off from the pipe 66 near the middle thereof and lead into the spreader arms 71, where the latter branch off from the trunk or riser 69 and thereby provide for injecting diluent hot exhaust gases into the mixture at the point of division of the flow in the intake manifold. Additional branch pipes 72 take off from the pipe 66 and lead to the respective ends of the spreader arms 71, so as to inject hot exhaust gases into the mixture opposite the intake ports, indicated by the dotted circles 73. Therefore, in the form shown in Fig. 9, exhaust gases for diluent purposes are introduced into the mixture at three successive points between the carburetor and the combustion chambers of the engine, thereby utilizing the exhaust gases for progressively increasing the temperature of the mixture and creating turbulence at the points of injection, so as to thoroughly diffuse the heat and render the mixture homogeneous. As in the forms previously described, the amount of exhaust gases required for each particular size and type of engine, should be carefully ascertained and the pipe connections or openings at the different points along the intake manifold carefully selected and adjusted to properly proportion the quantity injected at the several points to provide for the necessary total amount required.

Although, I have shown various forms and adaptations of apparatus for utilizing the injection of hot exhaust gases into the manifold, for creating turbulence and progressively raising the temperature of the mixture, it will be understood that the primary objects is to provide a suitable diluent for the mixture in the combustion chambers, the diluent being thoroughly mixed with the combustibles and air before it is introduced into the combustion chambers. Oviously a part of the diluent gases may be introduced by injecting hot exhaust gases into the preheated air as described in my application, Ser. No. 463,340, filed April 21, 1921, and additional amounts injected into the mixture between the metering device and the combustion chambers, as hereinbefore described. My method enables me to prepare completely vaporized, homogeneous fuel charges, having the properties of a superheated dry gas and to provide an excess of diluent gases, therein, in such proportions that when the mixture is introduced into the combustion chambers and mixed with the products of combustion remaining from the previous explosion, the mixture is capable of being subjected to high compression pressures without preignition and is not subject to auto-ignition or the formation of socalled detonating pressures after being ignited in the usual manner.

Therefore, I do not wish to be limited to the particular forms of apparatus shown, for, obviously, in carrying out my method, various modifications and adaptations may be made in the specific apparatus utilized, for the injection of hot exhaust gases into the manifold as a diluent without departing from the spirit and scope of the invention.

I claim:

1. In an internal combustion engine, the combination with intake and exhaust manifolds, of means for utilizing the exhaust for heating the mixture in the intake manifold and raising to and maintaining it at a superheating temperature above the boiling points of the combustibles, pipe connections between the exhaust and intake manifolds for conducting predetermined amounts of exhaust gases from the exhaust manifold into the intake manifold, a portion of said exhaust gases being introduced into the intake manifold at the intake valve chambers of the engine.

2. In an internal combustion engine, the combination with an exhaust manifold, of an intake manifold comprising a trunk and spreader arms, connecting means between the exhaust manifold and the junction of said trunk and spreader arms for introducing exhaust gases into the mixture and means for introducing exhaust gases into the mixture in each branch of the intake manifold, opposite the intake valve chambers of the engine.

3. In an internal combustion engine, the combination with exhaust and intake manifolds, of communicating connections between said manifolds for injecting hot exhaust gases into the intake manifold at a plurality predetermined successive points, for creating turbulence in the mixture at the points of injection and progressively raising the temperature thereof on its way to the engine.

4. In an internal combustion engine, the combination with an exhaust manifold of an intake manifold, surrounded and completely enclosed by said exhaust manifold, the manifolds being so arranged that the mixture and the exhaust gases are flowing in opposite directions, whereby the exhaust gases are adapted to progressively raise the temperature of the mixture and means for injecting predetermined amounts of the exhaust gases from the surrounding exhaust manifold into the intake manifold, said exhaust gases being injected at different points between the carburetor and the intakes of the combustion chambers, to thereby assist in progressively raising the temperature of the mixture and for creating turbulence in the mixture at the points of injection for rendering the mixture homogeneous and for thoroughly diffusing the heat of the exhaust gases.

5. In an internal combustion engine, the combination with an intake manifold, comprising a trunk and spreader arms, of an exhaust manifold adjacent thereto and means for conducting exhaust gases, from the exhaust manifold into the intake manifold at the lower end of the trunk thereof, at the junction between the trunk and spreader arms and into the spreader arms at the points where they connect with the ports of the engine.

6. In an internal combustion engine, the combination with intake and exhaust manifolds, of means for creating turbulence in the mixture at predetermined points in the intake manifold by injecting predetermined amounts of hot exhaust gases into the mixture at selected points along the intake manifold.

7. In an internal combustion engine, a combined intake and exhaust manifold, the intake manifold being surrounded by and spaced from the exhaust manifold, the arrangement being such that the flow of the exhaust gases in the exhaust manifold is opposite in direction from the flow of the mixture in the intake manifold, whereby the exhaust gases are utilized for progressively heating the mixture, and means for injecting or transferring exhaust gases from the exhaust manifold to the intake manifold at various selected points along the intake manifold, whereby the exhaust gases, although serving as a diluent for the mixture are, when so injected into the mixture, adapted to progressively heat the same.

8. In an internal combustion engine, a combined intake and exhaust manifold, the intake manifold being surrounded by and spaced from the exhaust manifold, the arrangement being such that the flow of the exhaust gases in the exhaust manifold is opposite in direction from the flow of the mixture in the intake manifold, whereby the exhaust gases are utilized for progressively heating the mixture, and means for injecting or transferring exhaust gases from the exhaust manifold to the intake manifold at various selected points along the intake manifold, whereby the exhaust gases, although serving as a diluent for the mixture are, when so injected into the mixture, adapted to progressively heat the same, the final temperature of the mixture of combustibles, air and exhaust gases being above the boiling points and below the dissociating or cracking points of the combustibles in the intake manifold.

9. In an internal combustion engine, the combination with intake and exhaust manifolds, of means for adding a controlling diluent to the mixture by transferring or injecting exhaust gases from the exhaust manifold into the intake manifold at different points spaced apart along the intake manifold, whereby the heat of the injected exhaust gases may be utilized for progressively raising the temperature of the mixture in the intake.

10. In an internal combustion engine, the combination of an intake manifold, comprising a trunk and spreader arms, an exhaust manifold adjacent thereto, means for utilizing the heat of the exhaust to heat the mixture in the intake manifold so as to completely vaporize and maintain the combustibles in a superheated state, said means including connections between said manifolds for permitting pretermined amounts of hot exhaust gases to pass directly from the exhaust manifold into the heated mixture in the intake manifold at a plurality of successive points along said trunk and spreader arms for creating turbulence at the points of injection, and progressively raising the temperature of the mixture, to produce, maintain and deliver a superheated homogeneous, gaseous mixture to the combustion chamber of the engine.

WILLIAM P. DEPPÉ.